United States Patent

Benner et al.

[11] Patent Number: 6,155,434
[45] Date of Patent: Dec. 5, 2000

[54] ASSEMBLY RAIL FOR A SWITCHING CABINET

[75] Inventors: Rolf Benner; Martina Köhler, both of Herborn; Udo Münch, Sinn; Wolfgang Reuter, Burbach, all of Germany

[73] Assignee: Rittal-Werk Rudolf Loh GmbH & Co. KG, Herborn, Germany

[21] Appl. No.: 09/308,351

[22] PCT Filed: Nov. 6, 1997

[86] PCT No.: PCT/EP97/06148

§ 371 Date: Jul. 19, 1999

§ 102(e) Date: Jul. 19, 1999

[87] PCT Pub. No.: WO98/23001

PCT Pub. Date: May 28, 1998

[30] Foreign Application Priority Data

Nov. 19, 1996 [DE] Germany ............................ 196 47 802

[51] Int. Cl.[7] .................................................. A47B 47/03
[52] U.S. Cl. ......................................... 211/26.2; 211/190
[58] Field of Search ................................... 211/189, 190, 211/191, 192; 108/110; 312/257.1, 264, 265.1, 265.2, 265.3

[56] References Cited

U.S. PATENT DOCUMENTS 4,796,541  1/1989  Halstrick ................................. 211/190

FOREIGN PATENT DOCUMENTS

| 173 985 | 3/1986 | European Pat. Off. . |
| 2259458 | 8/1975 | France . |
| 20 43 699 | 3/1972 | Germany . |
| 46-12575 | 3/1971 | Japan ..................................... 211/191 |
| 2044078 | 10/1980 | United Kingdom ................... 211/191 |

OTHER PUBLICATIONS

Rittal Catalogue 27, p. 178, no date.

*Primary Examiner*—Peter M. Cuomo
*Assistant Examiner*—Jerry A. Anderson
*Attorney, Agent, or Firm*—Pauley Petersen Kinne & Fejer

[57] ABSTRACT

An assembly rail for a switching cabinet, designed in a form of a stamped and bent part and having an assembly wall directed towards the inside of the switching cabinet. Lateral fixing devices, bent out of the assembly wall, are fitted with an assembly plate. Hooks are stamped and bent out of the assembly plate. The hooks can be inserted into fastening cavities of the vertical frame sections of the switching cabinet. The assembly rails can be firmly and easily secured to the frame sections with slotted fastening cavities if the hooks are bent out of the assembly plate around an axis of flexion extending in the longitudinal direction of the frame sections, if a protruding section of the hook is stamped out from the bending point and if a width of the hook is determined by the material thickness of the fastening plate.

2 Claims, 2 Drawing Sheets

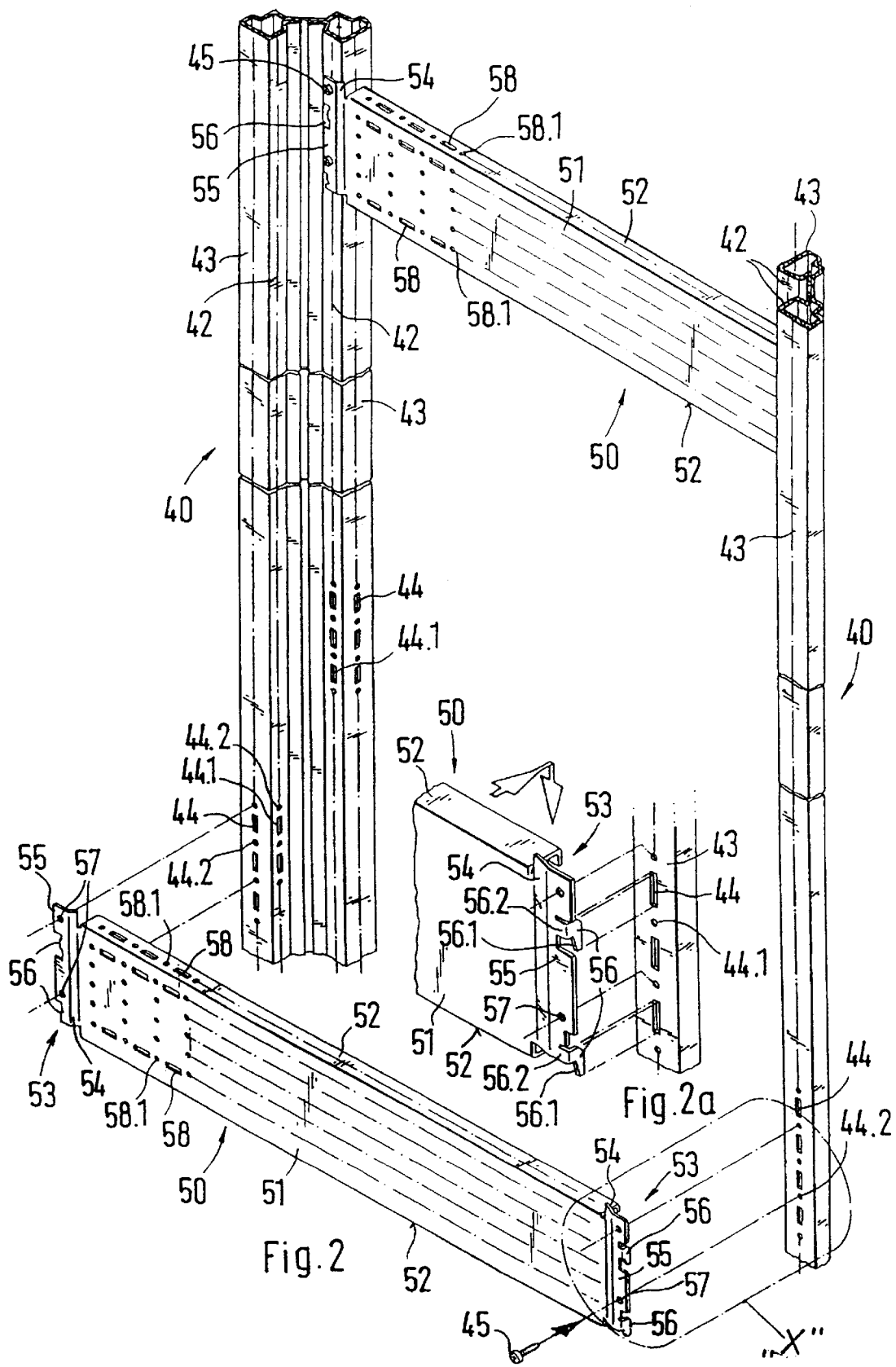

ASSEMBLY RAIL FOR A SWITCHING CABINET

BACKGROUND OF THE INVENTION

1. Field of the Invention

This invention relates to an assembly rail for a switching cabinet designed as a stamped-bent part and having an assembly wall facing an interior of the switching cabinet, wherein the assembly wall has bent out lateral fasteners equipped with a fastening plate and wherein hooks are stamped and bent out from the fastening plate so that the hooks can be inserted into fastening mounts in the frame sections of the switching cabinet.

2. Description of Prior Art

This type of assembly rail is known from a company brochure of Rittal-Werk Rudolf Loh GmbH & Co. KG, in Herborn, Germany: Rittal Handbook 27, page 178. The assembly rails are designed as U-shaped rails, which are lengthened on their ends by fasteners. The fastener consists essentially of a fastening plate, from which the hooks are bent out by two bends. This creates a shoulder running across the longitudinal direction of the vertical frame section. The hook is supported on the square fastening mount of the frame section with this shoulder. Screws are tightened into the fastening plate and frame section for attachment to the frame section.

SUMMARY OF THE INVENTION

It is one objective of this invention to provide a mounting rail of the type mentioned at the beginning but that permits stable attachment to such frame sections, such as those which have only narrow, slotted fastening mounts.

This objective is solved by bending hooks from a fastening plate around a bending axis running in a longitudinal direction of the frame section, stamping out a hook projection from the bending point and determining a width of the hook by the material thickness of the fastening plate.

The width of the hook in this assembly rail is determined only by the material thickness of the fastening plate and can therefore be incorporated in slotted fastening mounts. The fastening mounts can have a width that is minimally greater than the material thickness of the fastening plate.

Because the hook is bent around a bending axis running in the longitudinal direction of the frame section, a support point is produced between the bending point and the hook projection with which the hook is supported on the fastening mount. Thus, the bending point is not exposed to stress during loading of the assembly point. Force is introduced only into the support point prescribed and thus achieves stable fastening.

According to a preferred embodiment of this invention, the hook has a slope on its hook protrusion, by which, starting from the free end of the hook protrusion, it widens toward the bending point over its extent in the longitudinal direction of the connected frame section and the slope is braced against the fastening mount designed as a slotted mount. With this simple measure, the fastener is pulled flush against the frame section via the hook. Only with this wedging of the hook against the slotted mount, the assembly rail is already securely fastened. As additional security, the assembly rail can also be screwed to the frame section.

In one possible embodiment of this invention the fastening plate is connected to the assembly wall via a transition section and the hooks are stamped and bent out at right angles starting from the point on the fastening plate facing away from the transition section. Because the hooks are stamped out and bent from free sides of the fastening plate, they can be easily manufactured. In addition, the hooks are arranged close to the free side of the fastening plate. A corresponding section side of the frame section that carries the slotted mount can be designed to be narrow. Thus, a space-saving connection is possible between the frame section and the assembly rail.

The hooks can be connected to the fastening plate via elastic projections to balance tolerances. The elastic projections also permit rigid bracing between the frame section and the fastening plate. The elastic projections can be configured so that, starting from the point at which the hook is bent out, the elastic projections are cut out from the fastening plate and run parallel to it.

BRIEF DESCRIPTION OF THE DRAWINGS

This invention is further explained with reference to an embodiment shown in the drawings wherein:

FIG. 2 is an exploded perspective view of two vertical frame sections of the rack according to FIG. 1, with added assembly rails; and FIG. 2a is an exploded perspective view of a detail of the section marked X in FIG. 2.

DESCRIPTION OF PREFERRED EMBODIMENTS

Figure 1:
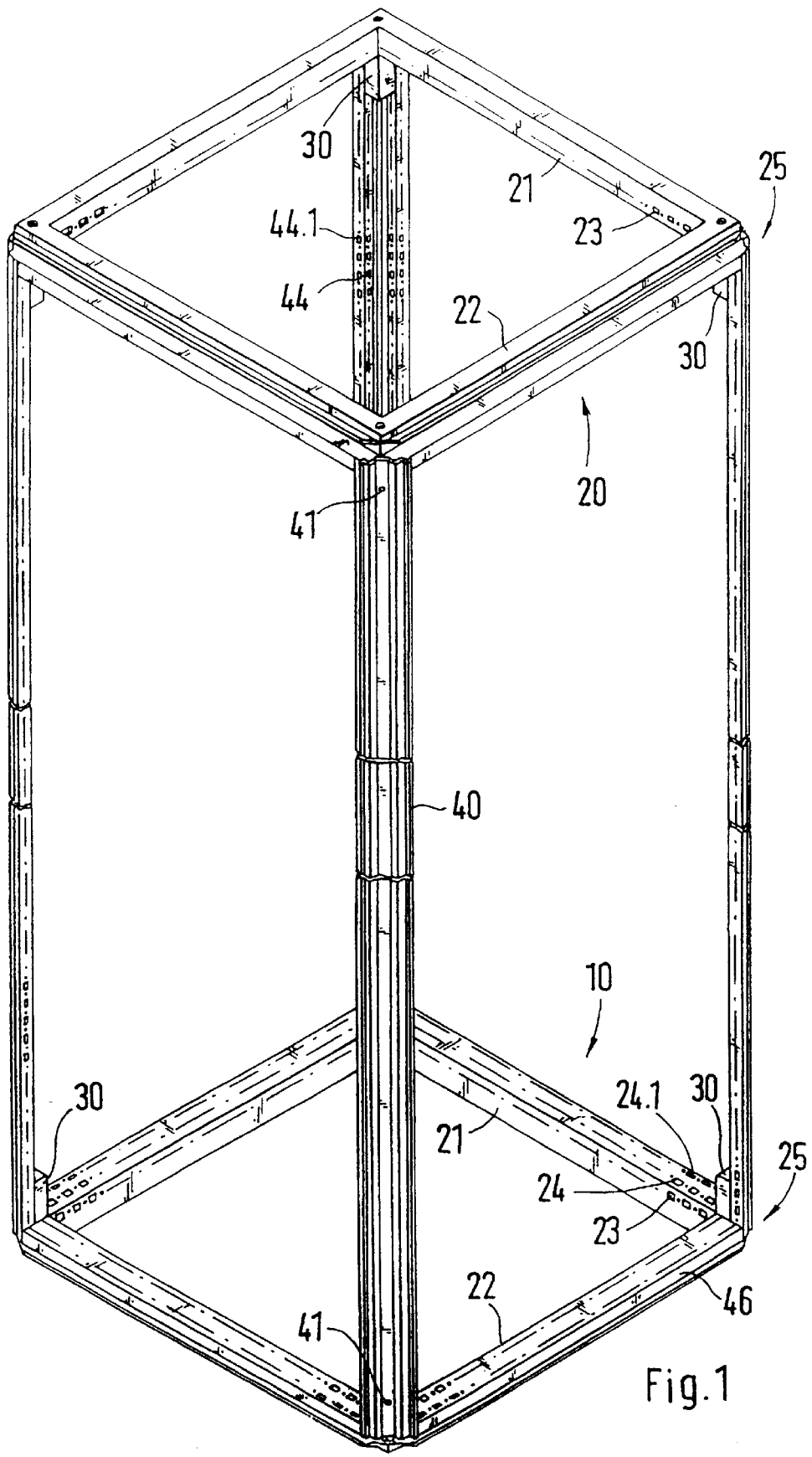
FIG. 1 is a perspective side view of a rack for a switching cabinet assembled from frame sections.

A rack for a switching cabinet is shown in FIG. 1. The rack is assembled essentially from a bottom frame 10, a top frame 20 and four vertical frame sections 40. The vertical frame sections 40 join the bottom frame 10 to the top frame 20. The bottom and top frames 10 and 20 are designed identically so that they are interchangeable.

The bottom and top frames 10 and 20 each have two depth and two width struts 21, 22. The depth and width struts 21, 22 have rows of fastening mounts 23, 24 on a section side facing an interior of the rack. The upward facing section sides of the bottom frame 10 and the downward-facing section sides of the top frame 20, respectively, also have a row of slotted mounts 24.1. The vertical frame sections 40 have slotted mounts 44, 44.1 that face the interior of the rack. Threaded mounts 44.2 are arranged between the individual slotted mounts 44, 44.1, 24.1.

The vertical frame sections 40 are joined to the bottom and top frames 10, 20, respectively, via connectors 30. The connectors 30 are arranged in the region of the corner mounts 25 of the bottom and top frames 10, 20, respectively. Attachment of the vertical frame sections 40 to the connectors 30 occurs, for example, with screws. For this purpose, the vertical frame sections 40 can have on an end screw mounts 41.

Two vertical frame sections 40 of the rack according to FIG. 1 are shown in cut-out view in FIG. 2. The frame sections have two internal walls 42 facing the interior of the rack. The internal walls 42 are at right angles to each other. Two section sides 43 are bent outward at right angles from the internal walls 42. Both the internal walls 42 and the section sides 43 have slotted mounts 44, 44.1 and threaded mounts 44.2. Assembly rails 50 can be attached to the slotted mounts 44, 44.1 and the threaded mounts 44.2.

The assembly rails 50 have an assembly wall 51 that faces the interior of the rack. The assembly wall has several parallel rows of slotted mounts 58 and threaded mounts 58.1. Bends 52 are bent at right angles from the broad side from the assembly wall 51. The bends 52 also have a row of slotted mounts 58 and threaded mounts 58.1, respectively. Fasteners 53 are used to attach the assembly rail 50 to the vertical frame sections 40. The fasteners 53 are bent at the end of the assembly wall 51. Thus, a transition section 54 is initially angled from the assembly wall 51. The transition section 54 leads into a fastening plate 55. The fastening plate 55 is aligned parallel to the assembly wall 51. Two hooks 56 are stamped out from the fastening plate 55 on its free side facing away from transition section 54. The hooks 56 are bent out around a vertical bending axis running in the longitudinal direction of frame section 40.

This detail can be further seen in FIG. 2a, which shows an enlarged view of the section in FIG. 2 marked with an X. It is readily apparent in FIG. 2a that the hook has a hook projection 56.1, which tapers toward its free end, starting from the bending side. A slope is thus formed.

To mount the assembly rails 50 on the vertical frame sections 40 the hooks 56 are inserted into the slotted mounts 44. The assembly rail is then forced downward. The slope of the hook projection 56.1 then slides past the internal edge of the slotted mount 44. Thus, the fastening plate 55 is pulled toward the section side 43. In this final assembly position the assembly rail is supported in the region between the bending point and the hook projection 56.1 on the fastening mount 44. For additional attachment, screw mounts 57 are placed in the fastening section, into which fastening screws 45 can be introduced and screwed into the threaded mounts 44.2 of the section sides 43 of the vertical frame sections 40. Hooks 56 can be joined directly or by means of an elastic projection 56.2 to the fastening point 55. Use of an elastic projection 56.2 has one advantage that the fastening plates are braced elastically against the section sides 43. Manufacturing tolerances can thus also be compensated.

It is apparent from FIG. 2 that assembly rails 50 can also be attached to the internal walls 42 of the vertical frame section 40. The assembly rails 50, which are attached here, are shorter than the assembly rails 50 that can be fastened to the section sides 43. Otherwise, the assembly rails 50 correspond in their technical configuration.

Two overlapping assembly rails 50 fastened to section sides 43 can also be joined to each other without difficulty via a third, vertically running assembly rail 50. The third assembly rail 50 is then fastened in the slotted mount 58 of the assembly wall 50 with its hooks 56.

What is claimed is:

1. In an assembly rail for a switching cabinet designed as a stamped-bent part and having an assembly wall facing an interior of the switching cabinet, wherein from the assembly wall lateral fasteners are bent out which have a fastening plate in which hooks are stamped and bent out from the fastening plate and the hooks are insertable into fastening mounts in a frame section of the switching cabinet, the improvement comprising:

the hooks (56) bent out from the fastening plate (55) around a bending axis running in a longitudinal direction of the frame section, and a hook projection (56.1) stamped out from a bending point and a width of hook (56) determined by a material thickness of the fastening plate (55);

the hook (56) having a slope on the hook projection (56.1), the hook (56) widened toward the bending point over an extent of the hook (56) in the longitudinal direction starting from a free end of the hook projection (56.1) and the slope braced against the fastening mount which is formed as a slotted mount (44);

the hooks (56) connected by elastic projections (56.2) to the fastening plate (55); and the elastic projections (56.2) starting from a site at which the hooks (56) each is bent out being cut out from the fastening plate (55) and running parallel to the fastening plate.

2. In an assembly rail according to claim 1, wherein the fastening plate (55) is connected to the assembly wall (51) by way of a transition section (54) and the hooks (56) are stamped and bent out at a right angle starting from a free side of the fastening plate (55) facing away from the transition section (54).

\* \* \* \* \*